(12) United States Patent
Abdal et al.

(10) Patent No.: US 12,502,064 B2
(45) Date of Patent: Dec. 23, 2025

(54) ASSESSMENT SYSTEM FOR HIGHER GRADES OF BINOCULAR VISION

(71) Applicant: KANOHI EYE PRIVATE LIMITED, Maharashtra (IN)

(72) Inventors: Md Oliullah Abdal, West Bengal (IN); Rajesh Prakash Kotwani, Mumbai (IN); Gul Jagdish Nankani, Mumbai (IN); Sonia Gul Nankani, Mumbai (IN); Vijay Srichand Talreja, Mumbai (IN)

(73) Assignee: Kanohi Eye Private Limited, Mumbai (IN)

( * ) Notice: Subject to any disclaimer, the term of this patent is extended or adjusted under 35 U.S.C. 154(b) by 499 days.

(21) Appl. No.: 17/928,260

(22) PCT Filed: May 26, 2021

(86) PCT No.: PCT/IN2021/050508
§ 371 (c)(1),
(2) Date: Nov. 28, 2022

(87) PCT Pub. No.: WO2021/240544
PCT Pub. Date: Dec. 2, 2021

(65) Prior Publication Data
US 2023/0200640 A1    Jun. 29, 2023

(30) Foreign Application Priority Data

May 27, 2020    (IN) .............................. 202021022269

(51) Int. Cl.
*A61B 3/08* (2006.01)
*A61H 5/00* (2006.01)

(52) U.S. Cl.
CPC ............... *A61B 3/08* (2013.01); *A61H 5/005* (2013.01)

(58) Field of Classification Search
CPC ............ A61B 3/08; A61B 3/111; A61H 5/005
(Continued)

(56) References Cited

U.S. PATENT DOCUMENTS

2013/0021456 A1    1/2013 Inoue et al.
2017/0296421 A1    10/2017 Travers et al.
(Continued)

OTHER PUBLICATIONS

Gargantini et al., "A random dot stereo acuity test based on 3D technology," Learning Analytics and Knowledge, ACM, New York, NY, USA, May 20, 2014, pp. 358-361.*
(Continued)

*Primary Examiner* — Stephone B Allen
*Assistant Examiner* — Boutsikaris Leonidas
(74) *Attorney, Agent, or Firm* — Seed Intellectual Property Law Group LLP

(57) ABSTRACT

Examples of assessing vergence capability of an individual are described. In an example, a first random dot stereogram is generated. The first random dot stereogram includes a first random arrangement of dots and a first sub-portion positioned against the first random dot stereogram. Thereafter, an input from an individual, identifying the position of the first sub-portion against the first random dot stereogram may be received. In response to receiving the input, a second random dot stereogram comprising a second sub-portion positioned against the second random dot stereogram, is generated. The second random dot stereogram comprises a second random arrangement which is different from the first random arrangement of dots in the preceding first random dot stereogram. In response to the second random dot stereogram, another input to identify position of the second sub-portion against the second random dot stereogram is received.

15 Claims, 6 Drawing Sheets

(58) Field of Classification Search
USPC .......................................................... 351/201
See application file for complete search history.

(56) References Cited

U.S. PATENT DOCUMENTS

2020/0049994 A1    2/2020   Tosic Rodgers et al.
2020/0329961 A1*  10/2020   Oz ........................... A61B 3/08

OTHER PUBLICATIONS

Extended European Search Report, dated May 8, 2024, for European Application No. 21813558.0-1122. (10 pages).
Gargantini et al., "A random dot stereoacuity test based on 3D technology," Learning Analytics and Knowledge, ACM, New York, NY, USA, May 20, 2014, pp. 358-361. (4 pages).
Budai et al., "Validation of dynamic random dot stereotests in pediatric vision screening", *Graefe's Archive for Clinical and Experimental Ophthalmology*, vol. 257(2): 413-423, Oct. 3, 2018. (11 pages).
Chen et al., "Stereoscopic depth perception varies with hues", *Optical Engineering*, 51(9): 97401-0 to 97401-6, Sep. 1, 2012. (7 pages).

* cited by examiner

ASSESSMENT SYSTEM FOR HIGHER GRADES OF BINOCULAR VISION

BACKGROUND

Visual capability involves each of the eyes of an individual to move and focus on an object. As the eyes of an individual move, the images captured by each of the eyes may be fused by the human brain to yield a singular vision known as binocular vision. Such motion or movement of the eyes is typically referred to as fusional vergence. Fusional vergence in turn may be utilized to assess the convergence and divergence ability of the eyes. Convergence may be referred to as the ability of the two eyes to turn inwards towards each other to look at an object. On the other hand, divergence is the ability of the eyes to turn outwards to look at a distant object. Eye conditions of individuals may undergo deterioration with age or certain other underlying conditions owing to which the convergence or the divergence ability of the individual may become impacted. Further, stereopsis is the perception of depth produced by the brain when viewing an object and may be utilized to assess the stereoacuity of an individual's eyes. Various assessment tests may be performed for determining the degree of fusional vergence of the eyes, to assess convergence and divergence ability of the eyes of an individual, as well as for assessing the stereoacuity of the eyes of an individual.

BRIEF DESCRIPTION OF FIGURES

The detailed description is provided with reference to the accompanying figures, wherein.

Figure 1:
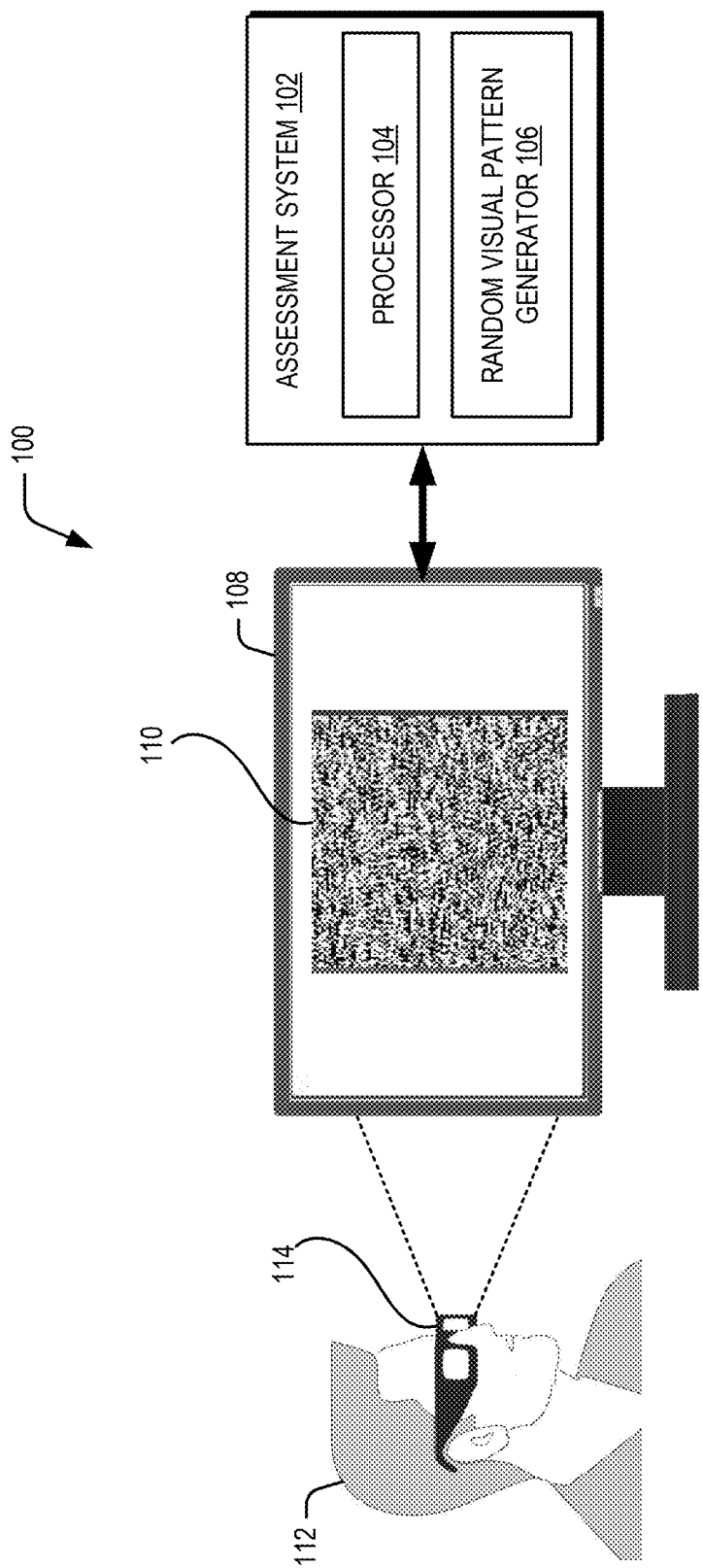
FIG. 1 illustrates an assessment environment for fusional vergence, according to an example.

Throughout the drawings, identical reference numbers designate similar, but not necessarily identical, elements. The figures are not necessarily to scale, and the size of some parts may be enlarged to more clearly illustrate the example shown. Moreover, the drawings provide examples and/or implementations consistent with the description; however, the description is not limited to the examples and/or implementations provided in the drawings.

DETAILED DESCRIPTION

Various higher grades of binocular vision disorders affecting individuals may include disorders, such as convergence insufficiency, divergence insufficiency, and stereo blindness. Fusional vergence diagnostic techniques are employed by a physician or an ophthalmologist for determining the convergence and divergence capability of an individual's eyes. When an individual is looking at a close by object, their eyes move or align towards each other, i.e., they converge and when an individual is looking towards a faraway object, their eyes move or align outwards, i.e., they diverge. An individual suffering from the inability to converge and/or diverge may thus not be able to properly focus on an object present within their visual range and may suffer from double vision (i.e., diplopia), headaches, blurred vision, eye strain, motion sickness, etc.

Conventionally, random dot stereogram (RDS) based diagnostic techniques may be used by a physician for diagnosing the fusional capability of an individual's eyes. A random dot stereogram is a stereoscopically separated pair of images of random dots which when viewed by the individual using a stereoscope, produces the perception of depth within the image. Different types of random dot stereograms may be used for performing the diagnosis, examples of which include, but are not limited to a Toegepast Natuurwetenschappelijk Onderzoek (TNO) random dot stereogram. For example, in the context of a TNO random dot stereogram, random dot stereograms within which half-images have been superimposed and displayed in complementary colors are used. In such a particular example, the complementary colors may include colors such as red and blue that are in accordance with the color filters within a stereoscope such as an anaglyph glass, which is being worn by an individual while the test is being performed.

Such techniques for diagnosing the fusional vergence capability of the individual's eyes involve displaying a random dot stereogram to an individual wearing a stereoscope or any other visual aid, on an electronic display device. Then, a sub-portion is rendered within the random dot stereogram and this sub-portion is slightly displaced within the random dot stereogram. This slight displacement is carried out in such a manner that when this sub-portion is viewed through a stereoscope by an individual with the proper convergence or divergence capability, the sub-portion is perceived to be raised or at a depth by an individual undergoing the test. The individual may then be prompted to identify the location of the sub-portion being rendered or presented on the display device using an input device. In case, there is a problem with the convergence or divergence capability of the individual's eye, then the individual may find it challenging to correctly identify the position of the sub-portion being rendered on the display device.

Similar tests may be performed subsequently, by changing the relative position of the sub-portion within the same random dot stereogram in response to an individual's selection. The change in the position of the raised sub-portion may be accomplished by changing the displacement between the relative placement of the random dots within the same random dot stereogram, i.e., during the testing process, the same random dot stereogram is presented to the individual on the display device. Using the data regarding the multiple selections performed by the individual, a physician may perform a diagnosis about the fusional capability of the individual's eyes and may further provide therapeutic assistance to the individual in order to treat their condition.

During the entire assessment procedure, the random dot stereogram remains unchanged. This may lead to a phenomenon referred to as fusional locking to occur while the test is being performed. The fusional locking refers to condition where eyes remains converged or diverged while looking at an object for a certain duration of time. While a random dot stereogram test takes place, the individual's vision may be focused on the random dot stereogram on the screen of the display device and this leads to pseudo fusion towards the random dot stereogram being viewed. The pseudo fusion results in fusional locking that may enable the individual to identify the raised sub-portion within the random dot stereogram even when they might not be able to do so under normal circumstances (i.e., when no fusional locking takes place within their brain). This in turn, may lead to false positives which may undermine the potential accuracy of the diagnostic test. Thus, the random dot stereogram based testing techniques may fail to correctly determine the degree of fusional vergence in case of both convergence and divergence accurately, which may prevent the physician from prescribing the proper treatment to an individual.

As may be understood, stereopsis is the ability of the eyes to perceive depth while receiving a visual stimulus. For example, when an individual looks at an object, each eye sees it from a slightly different angle and sends those images back to the brain. These images are then merged within the brain to yield a single image and the differences are utilized by the brain to perceive depth. Stereo blindness is the inability of to perceive stereoscopic depth by combining and comparing images from the two eyes. Conventionally, random dot stereograms are also used for measuring the stereoacuity (i.e., acuteness to this depth perception) of an individual's eyes. The tests performed for measuring the stereoacuity are similar to the tests performed for assessing the fusional capability of the eyes where the individual wearing a stereoscope may be asked to locate a sub-portion that is perceived to be raised. Such assessments are usually based on a fixed value of interpupillary distance. As may be appreciated, the interpupillary distance varies across individuals, for example, between adults and children. Since such approaches do not take into account the interpupillary distance between an individual's eyes, such assessments are inaccurate and may fail assess stereoacuity of an individual.

Systems and methods for performing assessment tests for an individual, are described. In an example, a first random dot stereogram is generated by a computing system. Once, the first random dot stereogram is generated, it is displayed to an individual wearing a visual aid using an electronic display device. A sub-portion of the random dot stereogram is defined against the first random dot stereogram. The individual is then prompted either by an indication on the display device or by a physician to identify the position of the raised sub-portion within the first random dot stereogram.

Once, a response in the form of a selection of the raised sub-portion is received from the individual, the system is operative to generate a second random dot stereogram at a predetermined interval of time. The second random dot stereogram thus generated is such that random arrangement of its constituent dots is different from the arrangement of constituent dots present in the preceding first random dot stereogram. In an example, the newly generated random dot stereogram may include a new arrangement of random dots with a different displacement value between the randomly placed dots than the preceding first random dot stereogram. Against this second random dot stereogram, a second sub-portion is rendered and presented for identification by the individual. In some examples, the physician or the individual may set the time interval between each of the consecutive random dot stereogram being generated, in response to every individual selection. Based on the individual's selection during these tests, the system may determine the degree of the fusional vergence of the individual's eyes.

As may be understood, generation of a second random dot stereogram which is different from the preceding stereogram at predetermined intervals, avoids occurrence of fusional lock within the individuals brain due to a jump duction taking place. A jump duction may be defined as the ability of the eyes to move from a visual task such as the random dot stereogram that requires convergence of eyes to divergence of the eyes (that may take place during the interval period) and back. This jump duction may allow the system to reset the fusional locking by the individual's brain. That is, jump ductions inhibits the possibility of fusional locking by the brain. This diagnostic approach helps to compensate for the errors in the diagnosis by preventing false positive results due to fusional locking of the brain. Hence, this approach allows the diagnostic system to determine the degree of fusional vergence, in case of both convergence and divergence accurately. These and other approaches are further explained in conjunction with the accompanying figures.

FIG. 1 illustrates an example assessment environment 100 for fusional vergence for assessing convergence and divergence capability of an individual. In the present example, the environment 100 may include an assessment system 102. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity. The assessment system 102 may further include a processor(s) 104 and a random visual pattern generator 106 (hereinafter referred to as the generator 106).

The processor 104 may be implemented as a dedicated processor, a shared processor, or a plurality of individual processors, some of which may be shared. Among other capabilities, the processor 104 may fetch and execute computer-readable instructions, (e.g., such instructions implementing the generator 106) from a machine-readable storage medium (not shown in FIG. 1). The machine-readable storage medium may include non-transitory computer-readable medium including, for example, volatile memory such as RAM (Random Access Memory), or non-volatile memory such as EPROM (Erasable Programmable Read Only Memory), flash memory, and the like.

In some embodiments, the assessment system 102 may also be coupled to a central diagnostic server, which comprise a random visual pattern generator 106 for performing the diagnostic test for fusional vergence through a network. In such a case, the network may be a private network or a public network and may be implemented as a wired network, a wireless network, or a combination of a wired and wireless network. The network may also include a collection of individual networks, interconnected with each other and functioning as a single large network, such as the Internet. Examples of such individual networks may include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

In operation, the assessment system 102 may further be coupled to a display device 108 onto which the generator 106 is to render a first random dot stereogram (such as the stereogram 110). The first random dot stereogram may comprise a first random arrangement of dots and a first sub-portion positioned against the first random dot stereogram. Herein, the first sub-portion may be rendered or presented such that it may provide a perception of depth to an individual 112 viewing the sub-portion through a stereoscopic viewing device 114 (in the event of eyes of the individual 112 having performant convergence or divergence ability). The assessment system 102 may prompt the user on the display device 108 to identify the position of the first sub-portion positioned against the first random dot stereogram.

Once, the input is received from the individual 112 identifying the position of the first sub-portion, the generator 106 is to further generate a second random dot stereogram. In an example, the second random dot stereogram may be generated after a predetermined interval of time. The second random dot stereogram may further include a second sub-portion rendered and positioned against the second random dot stereogram. In the present example, the second random dot stereogram thus generated by the generator 106 is such that it includes a random arrangement of dots which differs from the first random arrangement of dots in the preceding first random dot stereogram. In an example, the generator 106 may further generate subsequent random dot stereograms with each such subsequent random dot stereograms having a random arrangement of dots which differs from the random arrangement of dots in the preceding random dot stereogram.

Returning to the present example, the assessment system 102 may further prompt the individual 112 to identify position of the second sub-portion against the second random dot stereogram. As may be understood, the position of the second sub-portion may be different from the position of the first sub-portion. Based on the inputs received, the assessment system 102 may ascertain one of the convergence ability and the divergence ability of the eyes of the individuals. These and other aspects of the present subject matter are further described in greater detail in conjunction with further figures. As discussed above, the changing of the random dot stereogram for each successive attempt by an individual prevents the occurrence of fusional lock and enables more accurate fusional vergence testing for the individual, such as the individual 112.

Figure 2:
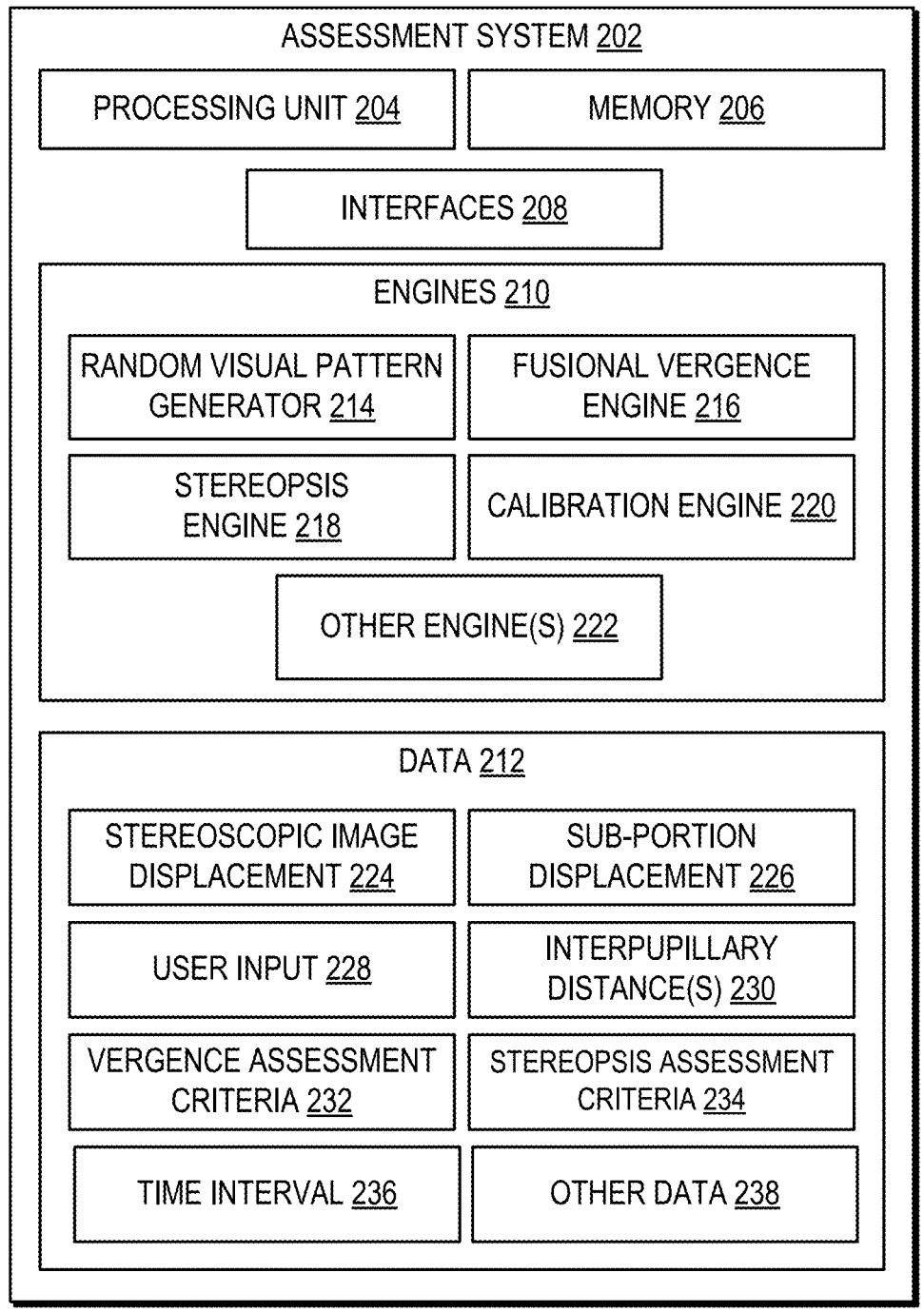
FIG. 2 illustrates a block diagram of an assessment system for assessment of fusional vergence and stereoacuity, according to another example.

FIG. 2 illustrates an example of an assessment system 202 for assessment of fusional vergence and stereoacuity. The assessment system 202 (hereinafter referred to as system 202) may further include a processing unit 204. Similar to the processor 104 of the assessment system 102 (as described in FIG. 1), the processing unit 204 may be implemented as a microprocessor, microcomputer, microcontroller, digital signal processor, central processing unit, state machine, logic circuitry, and/or any device that may manipulate signals based on operational instructions. The processing unit 204 may be a single computational unit or may include multiple such computational units, without deviating from the scope of the present subject matter.

The system 202 may further include memory 206, and interfaces 208. The interfaces 208 may include a variety of software and hardware interfaces that allow the system 202 to interact with other networked storages or networked devices, such as network entities, web servers, and external repositories, peripheral devices such as input/output (I/O) devices, and one or more display devices (not shown in FIG. 2 for sake of brevity). In another example, the interfaces 208 may also enable the communication between the processing unit 204, the memory 206 and other components of the system 202. The memory 206 may include any computer-readable medium known in the art including, for example, volatile memory, such as Static Random-Access Memory (SRAM) and Dynamic Random-Access Memory (DRAM), and/or non-volatile memory, such as Read-Only Memory (ROM), Erasable Programmable ROMs (EPROMs), flash memories, hard disks, optical disks, and magnetic tapes.

The system 202 may further include engines 210 and data 212. The engines 210 may be implemented as a combination of hardware and programming, for example, programmable instructions to implement a variety of functionalities of the engines 210. In examples described herein, such combinations of hardware and programming may be implemented in several different ways. For example, when implemented as a hardware, the engines 210 may be a microcontroller, embedded controller, or super I/O-based integrated circuits. The programming for the engines 210 may be executable instructions. Such instructions may be stored on a non-transitory machine-readable storage medium which may be coupled either directly with the system 202 or indirectly (for example, through networked means). In an example, the engines 210 may include a processing resource, for example, either a single processor or a combination of multiple processors, to execute such instructions. In the present examples, the non-transitory machine-readable storage medium may store instructions that, when executed by the processing resource, implement engines 210. In other examples, the engines 210 may be implemented as electronic circuitry.

The engines 210 in turn may include the random visual pattern generator 214, fusional vergence engine 216, stereopsis engine 218, calibration engine 220 and other engine(s) 222. The other engine(s) 222 may further implement functionalities that supplement applications or functions performed by the system 202 or any of the engines 210. The data 212, on the other hand, includes data that is either stored or generated as a result of functionalities implemented by any of the engines 210 or the system 202. It may be further noted that information stored and available in the data 212 may be utilized by the engines 210 for performing various functions by the system 202. In an example, data 212 may include values pertaining to the stereoscopic image displacement 224, the sub-portion displacement 226, user input 228, values pertaining to interpupillary distance(s) 230, vergence assessment criteria 232, stereopsis assessment criteria 234, time interval 236 and other data 238.

Such different data 212 may be utilized for performing vergence functions, as will be described below. The present approaches may be applicable to other examples without deviating from the scope of the present subject matter. It may be noted that the blocks representing engines 210 and data 212 are indicated as being within the system 202 for sake of explanation only. Any one or more blocks within engines 210 and data 212 may be implemented as separate blocks outside the system 202, with the different functional blocks being utilized for assessing fusional vergence or stereoacuity, as will be described further below.

The system 202 may perform assessment based on one or more random dot stereograms that may be generated by the random visual pattern generator 214 (referred to as the generator 214). In the context of the present example, the generator 214 may initially generate a first image layer. The first image layer generated by the generator 214 is such that it includes a first random arrangement of dots.

Figure 3:
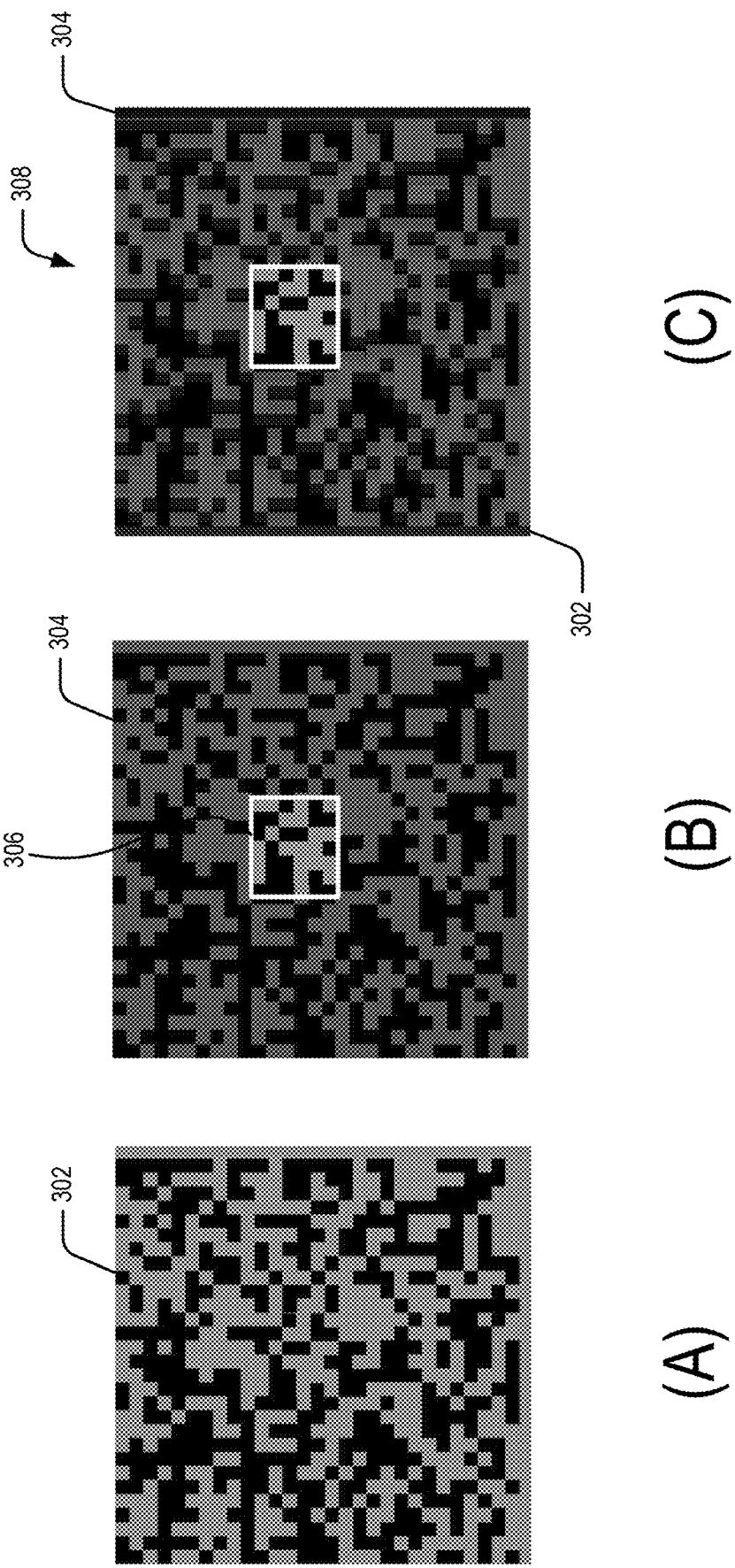
FIGS. 3(A), 3(B) and 3(C) illustrate generated random dot stereograms according to various examples.

For sake of explanation, one such first image layer, is depicted in FIG. 3(A) as the first image layer 302. In a similar manner, the generator 214 may further generate a second image layer, depicted as second image layer 304 which is initially similar to the first image layer 302. As shown in FIG. 3(B), the generator 214 may thereafter, select a portion 306 of the second image layer 304 which is shifted by a predetermined distance. In another example, a corresponding portion may also be selected in the first image layer 302, in which case, the sub-portion 306 may be formed by relative displacement between the portions of the first image layer 302 and the second image layer 304. In an example, the relative displacement may be measured or specified in diopters, e.g., in two diopters, four diopters, and so on. These are only examples and other values may be used without deviating from the scope of the claimed subject matter.

In an example, the predetermined distance may be selected from the values provided in the sub-portion displacement 226. The values of the sub-portion displacement 226 eventually result in the extent of the depth at which the first sub-portion 306 would be perceived by an individual. For example, a higher value of the sub-portion displacement 226 would result in the first sub-portion 306 appearing to be at a more pronounced depth as compared to instances when the sub-portion displacement 226 considered is less. In an example, the values of the sub-portion displacement 226 may be changed for while rendering a series of random dot stereograms.

It is pertinent to note at this stage that although depicted in grayscale, the first image layer 302 and the second image layer 304 may be based on a combination of different visual attributes. For example, the first image layer 302 and the second image layer 304 may be of different color combinations. Examples of such combinations include, but are not limited to, red-cyan, red-green, and red-blue. To this end, the first image layer 302 may be red (as depicted in a higher brightness) and the second image layer 304 may be blue (as depicted having lower brightness). Other color combinations may also be used without deviating from the scope of the present subject matter. In an example, the first image layer 302 and the second image layer 304 may be of different polarizations. In a similar manner, any such combinations of visual attributes may be used. Such examples would yet fall within the scope of the present subject matter.

As shown in FIG. 3(C), the generator 214 may overlay the first image layer 302 and the second image layer 304 to provide a first random dot stereogram, such as the first random dot stereogram 308. While overlaying the first image layer 302 and the second image layer 304, the generator 214 may either completely overlap the first image layer 302 and the second image layer 304. In another example, the first image layer 302 and the second image layer 304 may be offset by a distance to provide the first random dot stereogram 308. The offset distance, in the present example, may be based on the stereoscopic image displacement 224. The first random dot stereogram 308 generated by the generator 214 may depend on the different visual attributes of the constituent first image layer 302 and the second image layer 304, and thus may be accordingly viewable. For example, the first random dot stereogram 308 composed of red-cyan, red-green, and red-blue layers would be viewable through anaglyph glasses. In a similar manner, on the first image layer 302 and the second image layer 304 being of different polarization, the resulting first random dot stereogram 308 would be viewable by polarized glasses.

The first random dot stereogram 308 generated includes the first sub-portion 306 which may then be rendered onto a display device, such as the display device 108. When rendered, the display device 108 may also provide one or more visual indicators to prompt an individual (e.g., the individual 112) to identify the location of the first sub-portion 306 presented against the first random dot stereogram 308. The individual 112 may provide the input indicating the possible location of the first sub-portion 306 through one or more input devices (e.g., a mouse, a keyboard, or any other input device) that may be coupled to the system 202.

Figure 4:
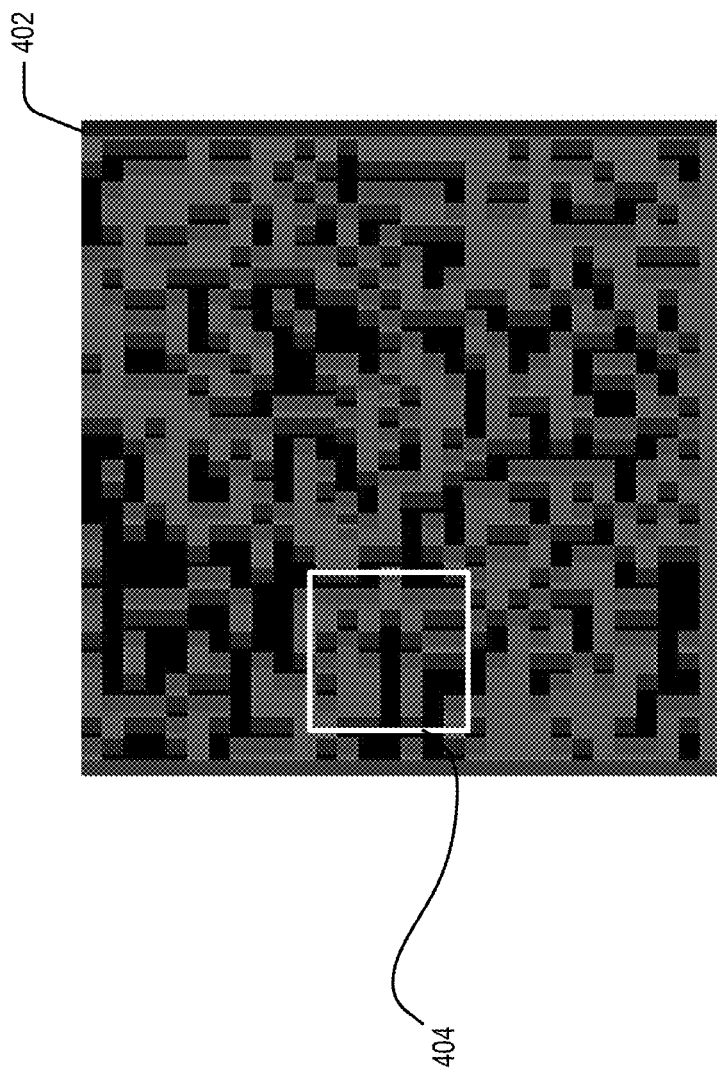
FIG. 4 illustrates a generated random dot stereograms according to a further example.

The input received by the system 202 is stored and recorded as user input 228. At this stage, the generator 214 may generate a second random dot stereogram, such as the second random dot stereogram 402, shown in FIG. 4. The second random dot stereogram 402 may be generated either in response to the user input 228 provided by the individual 112 or after a certain time interval (obtained from time interval 236) may have elapsed. To this end, the generator 214 may generate subsequent image layers each having a random arrangement of dots which differs from the random arrangement of dots of the first image layer 302 and the second image layer 304. Similar to the first random dot stereogram 308, the second random dot stereogram may also define a second sub-portion 404. The second sub-portion 404 may be formed in a manner which is similar to the defining of the first sub-portion 306 (as described in conjunction with FIG. 3(B)). For the second random dot stereogram, the generator 214 may generate the second sub-portion 404 and position it against the second random dot stereogram at a location which is different from the position of the first sub-portion 306. Herein, it is pertinent to note that the relative position of the second sub-portion 404 against the second random dot stereogram also differs from the relative position of the first sub-portion 306 against the first random dot stereogram.

The second random dot stereogram 402 may thereafter be rendered onto the display device (such as the display device 108) for viewing by the individual (e.g., the individual 112) through their stereoscopic viewing device 114. It may be noted that the second random dot stereogram 402 thus generated and rendered onto the display device 108 is different from the first random dot stereogram 308 owing to the difference in the arrangement of the random dots. Since the arrangement of the random dots differs between the first random dot stereogram 308 and the second random dot stereogram 402, occurrences of fusional lock may be avoided. Therefore, in addition to the change in the position of the sub-portions (i.e., the first sub-portion 306 and the second sub-portion 404), the underlaying arrangement of random dots also changes with the generation of each subsequent random dot stereogram which further aids in reducing the occurrences of fusional lock and further increases the accuracy of the fusional vergence being performed by the system 202.

Continuing further, the system 202 may further prompt the individual 112 to identify the location of the second sub-portion 404. Depending on the condition of the vision, the individual 112 may either successfully or unsuccessfully attempt to identify the location of the second sub-portion 404. The user input may then be stored as user input 228. Thereafter, the generator 214 may generate subsequent random dot stereograms, recursively, wherein which the position of subsequent sub-portions changes against the underlying random dot stereogram. In addition, the subsequent random dot stereograms are such that their respective arrangement of random dots differs from the arrangement of random dots in the preceding random dot stereograms. Each of such random dot stereograms may then be subsequently displayed on the display device 108 and user input 228 may accordingly be captured based on the input provided by the individual 112.

In an example, the time interval before which a subsequent random dot stereogram is generated, may be predefined. For example, a physician, or an ophthalmologist may select or define a time interval 236 based on their pre-examination of the individual 112. Based on the time interval 236 thus prescribed, the generator 214 may generate random dot stereograms after the prescribed time interval 236. The number of subsequent random dot stereograms that are generated may be defined or may be adjusted based on the condition of the individual 112. For each of the subsequent random dot stereograms, the corresponding user input 228 may be recorded. It is pertinent to note that the term user input 228 refers to any action or inaction that may occur on part of the individual 112. This is to say that user input 228 may indicate either a correct identification or an incorrect identification of the position of the respective sub-portions in the subsequent random dot stereograms. In cases where the individual 112 fails to provide any input, say within a threshold time interval, such an instance may be recorded null input within the user input 228.

The user input 228 may thereafter be analyzed by fusional vergence engine 216 to determine the convergence and the divergence capabilities of the individual 112 under consideration. In an example, the fusional vergence engine 216 may provide an assessment based on vergence assessment criteria 232 defined within the system 202. Alternatively, the assessment may be performed by the physician or the ophthalmologist based on the plurality of collected user input 228 without deviating from the scope of the present subject matter.

In an example, the calibration engine 220 may be used for calibrating the visual attributes of the dots based on which the random dot stereograms are eventually generated. For example, the calibration engine 220 may be utilized for calibrating the color of the random dots of the random dot stereograms. In such a case, if the individual is using stereoscopic viewing device 112, such as anaglyph glasses with red-blue lens colors, then the physician or the ophthalmologist may calibrate the colors shown on the display device by the diagnostic test to be aligned with the color of the anaglyph lens. As may be understood, the calibration engine 220 aligns the fusional vergence to conform with the condition of the individual 112 under consideration or perhaps based on the condition of the stereoscopic viewing device 114.

In an example, the system 202 may also be utilized for conducting a stereopsis test for assessing stereoscopic acuity of the individual 112. As described previously, the value of the stereoscopic image displacement 224 determines the extent of depth that may be perceived, say by the individual 112, while viewing the first random dot stereogram 308 with the sub-portion 306. Higher the value of the sub-portion displacement 226 would result in the sub-portion 306 appearing to be more pronounced when compared with a lower value of the sub-portion displacement 226.

Continuing with the present example, the stereopsis assessment may be implemented by the stereopsis engine 218. Before the stereopsis assessment may commence, the interpupillary distance of the individual 112 may be determined. The interpupillary distance of the individual 112 thus measured may be provided to the system 202. The value of the interpupillary distance provided to the system 202 may then be compared with the interpupillary distance(s) 230 predefined within the system 202. With the corresponding value of the interpupillary distance(s) 230, the stereopsis engine 218 may implement the stereopsis assessment. Considering that the stereopsis engine 218 is to implement the stereopsis assessment based on values of interpupillary distance(s) 230 conforming to the actual interpupillary distance of the individual 112, the stereopsis assessment thus conducted is more accurate.

To this end, the generator 214 may generate a plurality of random dot stereograms, such as the first random dot stereogram 308 and the second random dot stereogram 402. The first random dot stereogram 308, the second random dot stereogram 402 and subsequent random dot stereograms may each include respective sub-portions (e.g., sub-portions 306, 404).

For each of the generated random dot stereograms, the generator 214 may define and render the sub-portions based on varying values of the sub-portion displacement 226. The manner in which the sub-portions, such as the sub-portion 306, is defined and accordingly rendered against the random dot stereogram (such as the first random dot stereogram 308) has been explained in conjunction with FIG. 3. In an example, the first sub-portion 306 may be generated and rendered based on the interpupillary distance(s) 230. In another example, the second sub-portion 404 may also be generated and rendered based on the interpupillary distance(s) 230. In a similar manner, the generator 214 may generate the random dot stereograms with respective sub-portions based on varying values of the sub-portion displacement 226. It may be noted that each of such random dot stereograms will have a random arrangement of dots which is different from the random arrangement of dots present in the preceding random dot stereogram.

In an example, the generator 214 may generate a plurality of random dot stereograms by altering values of the sub-portion displacement 226. The generator 214 may select increasing values of the sub-portion displacement 226, as a result of which the depth of the respective sub-portions will be perceived as more pronounced, whereas selecting decreasing values of the sub-portion displacement 226 will result in the respective sub-portions to be less pronounced between each subsequent random dot stereograms. The stereopsis engine 218 may, depending on the user input 228, may either select increasing values or decreasing values of sub-portion displacement 226 for rendering the respective sub-portions of the plurality of random dot stereograms. For example, on determining that the individual 112 is correctly identifying the position of the sub-portion 306 in the first random dot stereogram 308, the generator 214 may generate the second random dot stereogram 402 having the sub-portion 404 based on a sub-portion displacement value which is less than the sub-portion displacement value of the sub-portion 306. In a similar manner, the sub-portion displacement 226 for subsequent sub-portions may be of a value which less than the sub-portion displacement 226 for preceding sub-portions. This will result in the respective sub-portions being less pronounced (and thereby increasing the difficulty level of the stereopsis assessment).

On the other hand, if it is determined that the individual 112 has been incorrectly identifying the position of the sub-portion 306 in the first random dot stereogram 308, the generator 214 may generate the second random dot stereogram 402 having the sub-portion 404 based on a sub-portion displacement value which is greater than the sub-portion displacement value of the sub-portion 306. If the number of incorrect user input 228 continue, greater values of sub-portion displacement 226 may be selected based on which respective sub-portions of the subsequent random dot stereograms may be defined and rendered. This will result in the respective sub-portions being less pronounced (and thereby increasing the difficulty level of the stereopsis assessment). The selection of the sub-portion displacement 226 values for defining and rendering the sub-portions in the random dot stereograms may be alternated based on the user input 228 without deviating from the scope of the present subject matter.

The stereopsis engine 218 may also select the values based on a predefined criteria while considering the user input 228. Once the user input 228 are obtained, the same may be analyzed by the stereopsis engine 218 based on one or more stereopsis assessment criteria 234. In the context of assessing stereoacuity, the stereoscopic image displacement 224 may be dependent on the viewing distance of the individual 112 from the rendered first random dot stereogram 308 on the display device 108. In another example, the sub-portion displacement 226 may also be based on the viewing distance and value of arc seconds, which in one example may depict the angle subtended by the sub-portions on the eye of the individual 112.

Figure 5:
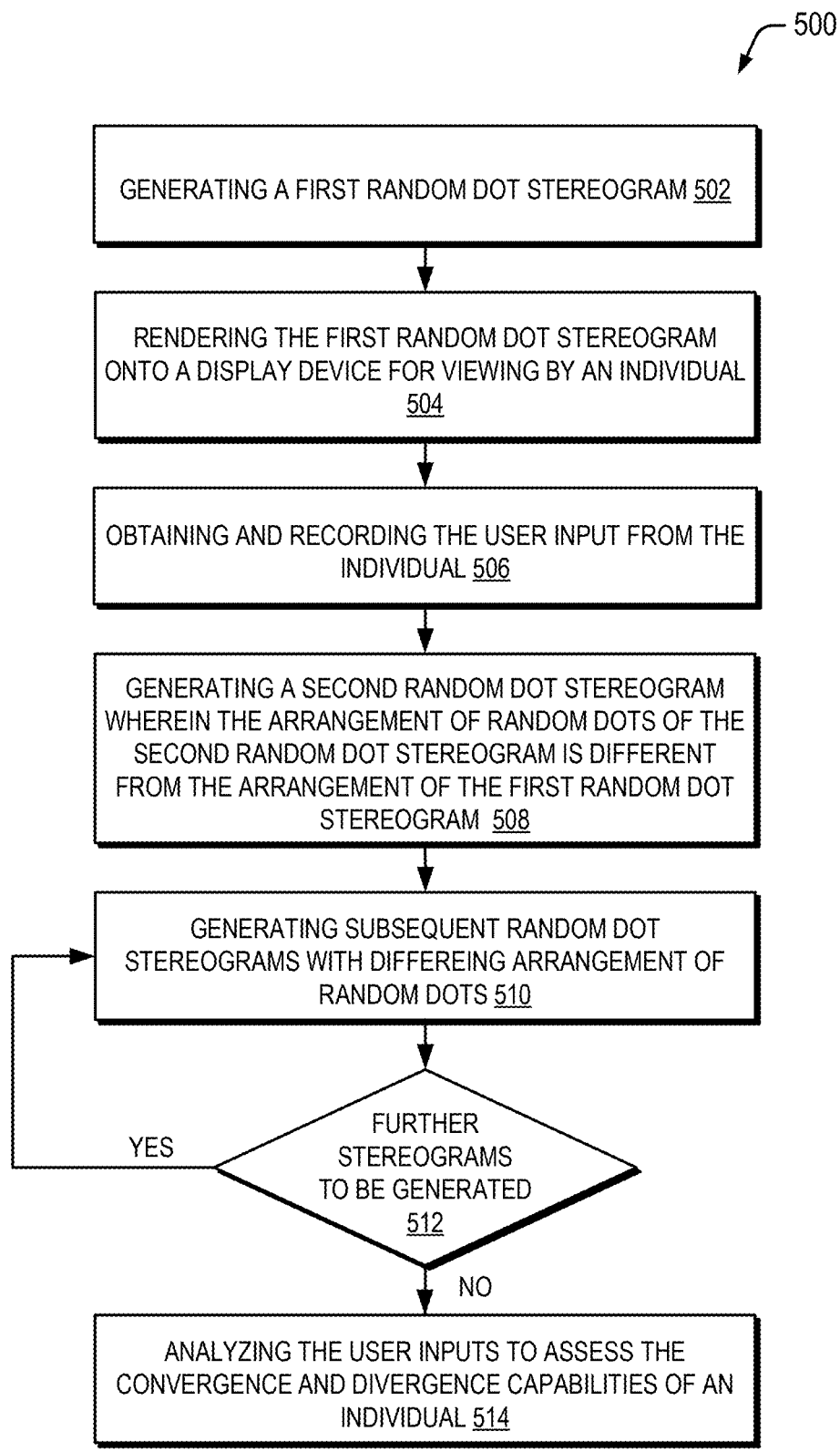
FIG. 5 illustrates a method for assessments in relation to convergence and divergence capability of an individual, according to an example.

FIG. 5 illustrates a method 500 for performing a variety of assessments in relation to convergence and divergence capability of an individual, as per an example. Although the method 500 may be implemented in a variety of computing devices, for the ease of explanation, the present description of the example method 500 is provided in reference to the above-described systems 102 and 202 (collectively referred to as systems 102, 202).

The order in which the method 500 is described is not intended to be construed as a limitation, and any number of the described method blocks may combine in any order to implement the method 500, or an alternative method. It may be understood that the blocks of the method 500 may be performed by any one of the devices 102, 202. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, a first random dot stereogram may be generated. For example, the generator 214 may generate a first random dot stereogram 308 based on the first image layer 302 and the second image layer 304. As may be understood, the first random dot stereogram 308 may include a sub-portion 306 which may be located at a position on the first random dot stereogram 308. The first random dot stereogram 308 is characterized by a first arrangement of random dots. It is pertinent to note at this stage that although depicted in grayscale, the first image layer 302 and the second image layer 304 may be based on a combination of different visual attributes. For example, the first image layer 302 and the second image layer 304 may be of different color combinations. Examples of such combinations include, but are not limited to, red-cyan, red-green, and red-blue.

At block 504, the first random dot stereogram may be rendered onto a display device for viewing by an individual. In an example, the generator 214 may render the first random dot stereogram 308 onto the display device 108. The first random dot stereogram 308, which includes the sub-portion 306, may be viewed by the individual 112 through an appropriate stereoscopic viewing device 114.

At block 506, the user input from the individual undergoing assessment may be obtained and recorded by the assessment system. For example, the individual 112 may attempt to identify the position of the sub-portion 306 through an input device which may be coupled to the system 102, 202. The input provided by the individual 112 may thereafter be recorded as user input 228.

At block 508, a second random dot stereogram may be generated. For example, the generator 214 may generate a second random dot stereogram 402. In a manner similar to the generation of the first random dot stereogram 308, the generator 214 may generate subsequent image layers each having a random arrangement of dots which differs from the random arrangement of dots of the first image layer 302 and the second image layer 304. Similar to the first random dot stereogram 308, the second random dot stereogram may also define a second sub-portion 404. The second sub-portion 404 may be positioned at a location which is different from the position of the sub-portion 306. The second random dot stereogram 402 may then be rendered onto the display device 108 for viewing by the individual 112 and for identification of the second sub-portion 404.

At block 510, subsequent random dot stereograms may be generated recursively, and presented to the individual. For example, the generator 214 may generate subsequent random dot stereograms wherein a random dot stereogram under consideration includes an arrangement of random dots which is different from the arrangement of random dots of the any one or more of the preceding random dot stereograms. Each of such random dot stereograms further includes a respective sub-portion, the position of which may change between the different random dot stereograms being generated by the generator 214.

At block 512, it may be ascertained whether any further random dot stereograms are to be generated. In an example, the fusional vergence engine 216 may check based on vergence assessment criteria 232 whether any further random dot stereograms are to be generated and presented to the individual 112. If further assessment is to be conducted ('Yes' path from the block 512), the method may proceed to block 510 where a subsequent random dot stereogram may be generated. The process may be iteratively repeated till a specific number of random dot stereograms have been generated and respective user input 228 have been obtained. In an example, the number of random dot stereograms which may be generated and presented to the individual 112 may be predefined or may be specified by the physician or the ophthalmologist conducting said assessment.

If no subsequent random dot stereograms are to be generated ('No' path from block 512), the user inputs may be analyzed to assess the convergence and divergence capabilities of an individual. For example, the fusional vergence engine 216 may analyze the user input 228 provided by the individual 112 to assess their convergence and divergence capabilities. In an example, the results of the assessment may be displayed through the display device 108.

Figure 6:
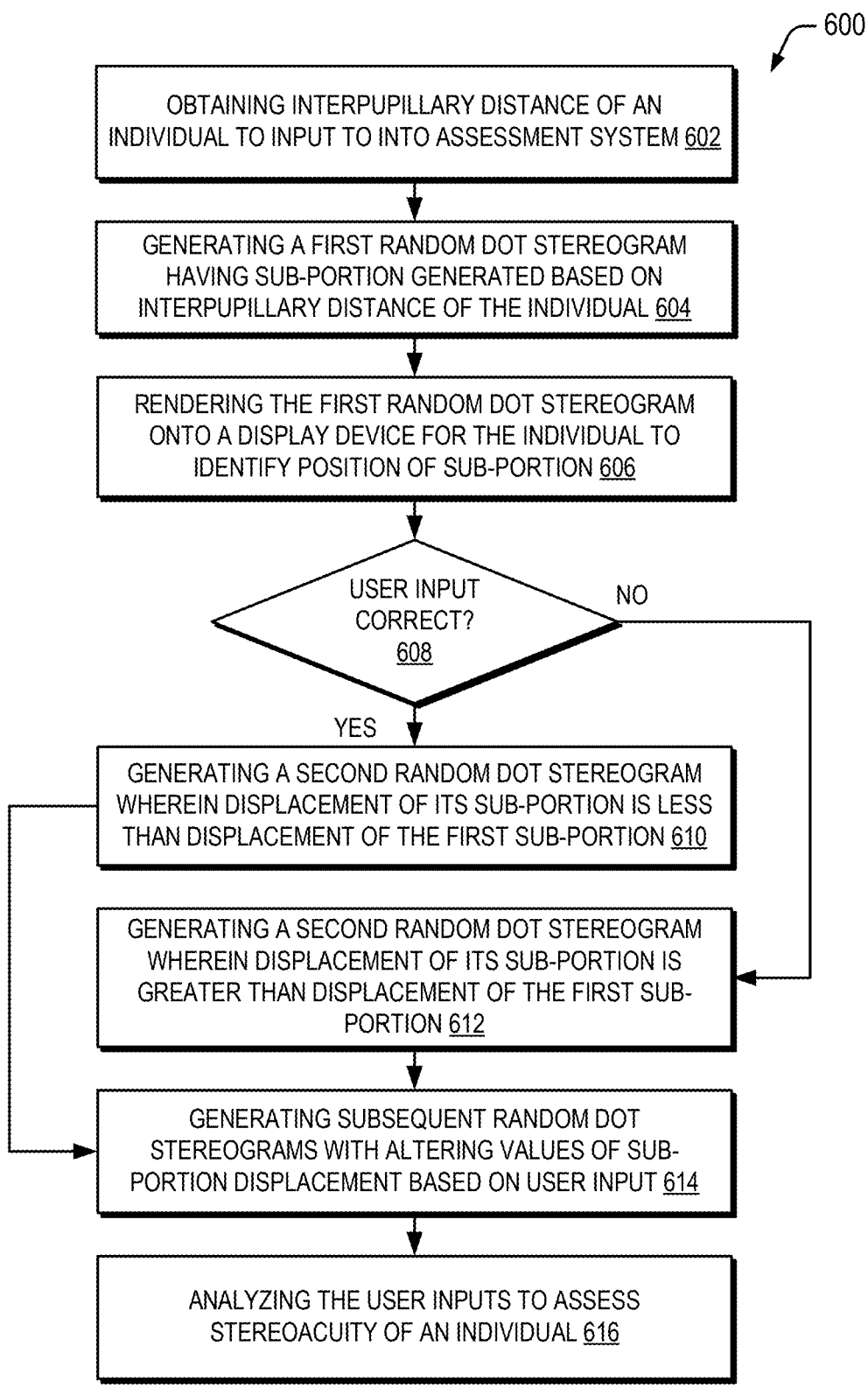
FIG. 6 illustrates a non-transitory computer readable medium for assessing stereoacuity of an individual, according to an example.

FIG. 6 illustrates a method 600 for assessing stereoacuity of an individual, as per one example. Similar to the method 500, the order in which the method 600 is described is not intended to be construed as a limitation, and any number of the described method blocks may combine in any order to implement the method 600, or an alternative method. It may be understood that the blocks of the method 600 may be performed by any one of the devices 102, 202. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, an interpupillary distance of an individual is obtained and input into the assessment system. In an example, the interpupillary distance of the individual 112 may be measured by the physician or the ophthalmologist. The value of the interpupillary distance of the individual 112 may then be input into the assessment system 102, 202. In an example, the value of the interpupillary distance may be stored in interpupillary distance(s) 230.

At block 604, a first random dot stereogram having a first sub-portion, wherein such a first sub-portion may be generated based on the interpupillary distance value of an individual. For example, the generator 214 may generate the first random dot stereogram 308, wherein the sub-portion 306 is based on the interpupillary distance(s) 230 corresponding to the individual 112.

At block 606, the first random dot stereogram is rendered and displayed on the display device coupled to the assessment system. For example, the first random dot stereogram 308, which in turn includes the sub-portion 306, is displayed on the display device 108 for identification by the individual 112. The individual 112 may then attempt to identify the position of the sub-portion 306 and accordingly provide their input. The input from the individual 112 is stored as user input 228.

At block 608, the user input provided by the individual may be assessed to determine whether the position of the sub-portion was correctly identified. For example, if the user input 228 is assessed to be correct ('Yes' path from block 608), the generator 214 may further generate the second random dot stereogram 402 with the sub-portion 404 (block 610). In the present instance, the sub-portion 404 is generated based on the sub-portion displacement 226 value which is less than the sub-portion displacement 226 value of the sub-portion 306. This, as a result, will render the sub-portion 404 in a manner which will be less pronounced to the individual 112 wearing the stereoscopic viewing device 114.

On the other hand, if the user input 228 is assessed to be incorrect ('No' path from block 608), the generator 214 may further generate the second random dot stereogram 402 with the sub-portion 404 having the sub-portion displacement 226 which is greater than the value of the sub-portion displacement 226 for the sub-portion 306 (block 612). For both blocks 610, 612, the second random dot stereogram 402 generated may be such that the arrangement of random dots of the second random dot stereogram 402 is different from the arrangement of random dots of the first random dot stereogram 308.

The method from blocks 610, 612 may proceed to block 614 wherein which subsequent random dot stereograms with respective sub-portions may be generated. In such cases, the generator 214 may generate the subsequent random dot stereograms. Similar to the second random dot stereogram 402, the arrangement of random dots of the each of the subsequent random dot stereograms is different from the arrangement of random dots of the preceding random dot stereograms. Furthermore, the respective sub-portions may be defined and generated by altering the values of the sub-portion displacement 226. Each of the random dot stereograms and the respective sub-portions may be presented to the individual 112, and the user input 228 may be accordingly obtained. The altering of the sub-portion displacement 226 may be based on the user input 228 provided by the individual 112. For example, the generator 214 may define and generate the respective sub-portions in the subsequent random dot stereograms with increasing values or decreasing values of the sub-portion displacement 226, depending on whether the individual 112 is providing incorrect (or null) or correct inputs, respectively.

At block 616, the user input may be analyzed to assess the stereoacuity of the individual. In an example, the stereopsis engine 218 may analyze the user input 228 to assess the stereoacuity of the individual 112. The analysis may be based on the stereopsis assessment criteria 234, as per one example. In another example, the stereopsis engine 218 may perform the analysis based on one or more parameters pertaining to the individual 112.

As also described previously, in the context of assessing stereoacuity, the stereoscopic image displacement 224 may be dependent on the viewing distance of the individual 112 from the rendered first random dot stereogram 308 on the display device 108. In another example, the sub-portion displacement 226 may also be based on the viewing distance and value of arc seconds, which in one example may depict the angle subtended by the sub-portions on the eye of the individual 112.

Various aspects of the present subject matter may be implemented in the form of an interactive game wherein, multiple random dot stereogram may be presented on the display device in the form of various articles, such as cars, and the individual may be prompted to select the article which is perceived to be raised in the individual's 112 view while wearing a stereoscopic viewing device 114. In another example, a sub-portion within the random dot stereogram may be implemented in the shape of obstacle and the individual 112 is to drive an article such as a car on the display device using an input device in order to avoid obstacles that are perceived to be raised by the individual 112. The difficulty of the game may be raised by decreasing the displacement of the sub-portions in the raised obstacles as the user as the user clears more levels of the game. Such examples would also be within the scope of the claimed subject matter.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A system comprising:
a processor;
a random visual pattern generator coupled to the processor, wherein the random visual pattern generator is to:

generate a first random dot stereogram comprising:
  a first random arrangement of dots; and
  a first sub-portion positioned against the first random dot stereogram;
receive an input from an individual to identify position of the first sub-portion against the first random dot stereogram;
in response to receiving the input, generate a second random dot stereogram comprising a second sub-portion positioned against the second random dot stereogram, wherein the second random dot stereogram comprises a second random arrangement of dots which is different from the first random arrangement of dots in the preceding first random dot stereogram, wherein the second random arrangement of dots in the second random dot stereogram is generated with a different displacement value between the randomly placed dots as compared to the displacement value between the randomly placed dots of the first random dot stereogram; and
receive another input from the individual to identify position of the second sub-portion against the second random dot stereogram.

2. The system as claimed in claim 1, wherein the system comprises a calibration engine coupled to the processor, to calibrate visual attributes of the random dots within the random dot stereogram based on stereoscopic viewing device for viewing the random dot stereogram.

3. The system as claimed in claim 1, wherein the random visual pattern generator is to generate the first sub-portion based on an interpupillary distance of the individual.

4. The system as claimed in claim 1, wherein the position of the second sub-portion relative to the second random dot stereogram is different from the position of the first sub-portion relative to the first random dot stereogram.

5. The system as claimed in claim 1, wherein the system comprises a fusional vergence engine coupled to the processor, to assess, based on the identification of the position of one of the first sub-portion and the second sub-portion against the respective random dot stereogram, the fusional vergence capability of the individual.

6. The system as claimed in claim 1, wherein the system comprises a stereopsis engine coupled to the processor, to assess, based on the identification of the position of one of the first sub-portion and the second sub-portion against the respective random dot stereogram, stereoacuity of the individual.

7. The system as claimed in claim 1, wherein the random visual pattern generator to generate the first random dot stereogram is to:
  generate a first image layer comprising a random arrangement of dots;
  generate a second image layer, wherein the second image layer is identical to the first image layer;
  select corresponding portions on the first image layer and the second image layer;
  overlay the first image layer and the second image layer to provide the first sub-portion of the first random dot stereogram; and
  relatively shift the portion of the second image layer by a predetermined distance to generate the first sub-portion.

8. The system as claimed in claim 7, wherein the displacement between the first image layer and second image layer is in diopters.

9. A method comprising:
generating a first random dot stereogram comprising:
  a first random arrangement of dots; and
  a first sub-portion positioned against the first random dot stereogram;
receiving an input from an individual, identifying the position of the first sub-portion against the first random dot stereogram;
in response to receiving the input, generating a second random dot stereogram comprising a second sub-portion positioned against the second random dot stereogram, wherein the second random dot stereogram comprises a second random arrangement of dots which is different from the first random arrangement of dots in the preceding first random dot stereogram, wherein the second random arrangement of dots in the second random dot stereogram is generated with a different displacement value between the randomly placed dots as compared to the displacement value between the randomly placed dots of the first random dot stereogram; and
receiving another input from the individual to identify position of the second sub-portion against the second random dot stereogram.

10. The method as claimed in claim 9, wherein the method comprises calibrating visual attributes of the random dots within the first random dot stereogram and the second random dot stereogram based on attributes of a stereoscope viewing device for viewing the random dot stereograms.

11. The method as claimed in claim 9, wherein ene of the first sub-portion and the second sub-portion is generated based on a measured interpupillary distance of the individual.

12. The method as claimed in claim 9, wherein the second random dot stereogram is generated after a predetermined interval of time from one of the generation of the first random dot stereogram and the receiving a user input in response to the first random dot stereogram.

13. The method as claimed in claim 9, wherein the method comprises assessing the fusional vergence capability of the individual's eyes, based on the identification of the position of one of the first sub-portion and the second sub-portion against the respective random dot stereogram and a plurality of vergence assessment criteria.

14. The method as claimed in claim 9, wherein the method comprises assessing the stereoacuity of the individual's eyes, based on the identification of the position of one of the first sub-portion and the second sub-portion against the respective random dot stereogram and a plurality of stereopsis assessment criteria.

15. A non-transitory computer-readable medium comprising instructions, the instructions being executable by a processing resource to:
generate a first random dot stereogram comprising:
  a first random arrangement of dots; and
  a first sub-portion positioned against the first random dot stereogram;
receive an input from an individual to identify position of the first sub-portion against the first random dot stereogram;
in response to receiving the input, generate a second random dot stereogram comprising a second sub-portion positioned against the second random dot stereogram, wherein the second random dot stereogram comprises a second random arrangement of dots which is different from the first random arrangement of dots in the preceding first random dot stereogram, wherein the second random arrangement of dots in the second random dot stereogram is generated with a different displacement value between the randomly placed dots as compared to the displacement value between the randomly placed dots of the first random dot stereogram; and receive another input from the individual to identify position of the second sub-portion against the second random dot stereogram.

\* \* \* \* \*